United States Patent
Aoyagi

(10) Patent No.: US 7,663,114 B2
(45) Date of Patent: Feb. 16, 2010

(54) CASSETTE TYPE RADIATION IMAGE DETECTOR

(75) Inventor: Shigeru Aoyagi, Nishitokyo (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 0 days.

(21) Appl. No.: 11/985,492

(22) Filed: Nov. 15, 2007

(65) Prior Publication Data

US 2008/0118034 A1  May 22, 2008

(30) Foreign Application Priority Data

Nov. 20, 2006   (JP)   ............................. 2006-312623

(51) Int. Cl.
*G01T 1/24* (2006.01)
(52) U.S. Cl. ................................. 250/370.09
(58) Field of Classification Search ............ 250/370.09, 250/580
See application file for complete search history.

(56) References Cited

U.S. PATENT DOCUMENTS 6,825,472 B2 * 11/2004 Endo ...................... 250/370.09
2004/0227096 A1 * 11/2004 Yagi ....................... 250/370.09
2005/0017188 A1 *  1/2005 Yagi ....................... 250/370.09
2005/0056789 A1 *  3/2005 Spahn et al. ........... 250/370.09

FOREIGN PATENT DOCUMENTS

JP    2001-346788 A    12/2001
JP    2004-184679 A     7/2004

* cited by examiner

*Primary Examiner*—David P Porta
*Assistant Examiner*—Marcus H Taningco
(74) *Attorney, Agent, or Firm*—Frishauf, Holtz, Goodman & Chick, P.C.

(57) ABSTRACT

A cassette type radiation image detector having a box-shaped cassette housing configured by engaging a front member that is light-shielding and radiation-transmissive, with a light-shielding back member, and a two-dimensional array type radiation detection sensor for detecting radiation images incorporated in the radiation image detector, the radiation image detector including: a sensor supporting member that supports the radiation detection sensor; a first engaging member provided at the sensor supporting member; a second engaging member provided at the back member; and a shock absorbing member positioned between the first engaging member and the second engaging member, wherein the box-shaped cassette housing is formed by engaging the first engaging member with the second engaging member via the shock absorbing member.

5 Claims, 4 Drawing Sheets

CASSETTE TYPE RADIATION IMAGE DETECTOR

RELATED APPLICATION

This application is based on Japanese Patent Application No. 2006-312623 filed on Nov. 20, 2006 in Japanese Patent Office, the entire content of which is hereby incorporated by reference.

BACKGROUND OF THE INVENTION

1. Field of the Invention

The present invention relates to cassettes having built in 2-dimensional array type radiation detection sensors.

2. Description of the Related Art

Radiation images typified by X-ray images have conventionally been used very widely in diagnosis of illnesses, non-destructive testing, etc.

The technology of radiating the X-rays that have passed through the photographed object onto a phosphor screen, exposing a silver halide film using the visible light generated from the phosphor screen, and obtaining a radiation image by chemically developing this film has a long history and has been contributing in a big way to the diagnosis of illnesses.

At present, in order to reduce the radiation dose, and to meet the requirements of compatibility with digital image processing, a technology has been widely adopted in which a latent image is formed by irradiating the X-rays that have passed through the photographed object onto an optically excitable phosphor sheet, and the X-ray image is read out by receiving the optically excited light emission produced by applying an excitation light such as a laser bean onto this latent image.

Further, in the recent years, even radiation imaging systems of detecting the X-rays that have passed through the photographed object using a radiation image detector that uses a semiconductor two-dimensional array type radiation image detection sensor have come into wide use.

This radiation image detector is very often used by enclosing it in a container that is usually called a cassette and that is a thin, lightweight, and is easy to carry box, so that it is very convenient for photographing a wide range of body parts quickly.

Photography using such a cassette type radiation image detector is different from the fixed position photographing equipment in that it is carried out by positioning the cassette appropriately to suit the condition of the patient who is the target of photography.

In such photography, since it is possible that the cassette is placed below the patient's body or, in some cases, since the patient is made to stand on the cassette, it is necessary to make the cassette have sufficient strength. In addition, there may also be unexpected accidents in which the cassette is dropped down to the ground while handling it.

Therefore, cassette type radiation image detectors used in this manner are required to have the strength to protect the radiation detection sensor inside the unit against static loads, and also to have shock resistance so that the internal radiation image detection sensor doe not get damages when the cassette is dropped down to ground.

For example, in Japanese Unexamined Patent Application Publication No. 2001-346788, concerning improvement of shock resistance, a proposal has been made of improving the shock resistance by providing shock absorbing material at the edges on the interior of the cassette. In addition, in Japanese Unexamined Patent Application Publication No. 2004-184679, a proposal has been made of filling the interior of the cassette by filler materials.

However, in a cassette type radiation image detector according to these proposals, the means for improving the shock resistance obstructs the size reduction and weight reduction desired of a cassette, or may also decrease the ease of assembly during manufacture or the ease of maintenance in the market.

The present invention was made in view of the above situation, and the purpose of the present invention is to provide a cassette type radiation image detector having a shock resistance that can protect the radiation image detection sensor sufficiently when the cassette is dropped, while at the same time not losing its small size and light weight.

SUMMARY

According to one aspect of the present invention, there is provided a cassette type radiation image detector, having a box-shaped cassette housing configured by engaging a front member that is light-shielding and radiation-transmissive, with a light-shielding back member, and a two-dimensional array type radiation detection sensor for detecting radiation images incorporated in the radiation image detector, the radiation image detector comprising: a sensor supporting member that supports the radiation detection sensor; a first engaging member provided at the sensor supporting member; a second engaging member provided at the back member; and a shock absorbing member positioned between the first engaging member and the second engaging member, wherein the box-shaped cassette housing is formed by engaging the first engaging member with the second engaging member via the shock absorbing member.

DETAILED DESCRIPTION OF THE PREFERRED EMBODIMENT

Figure 1:
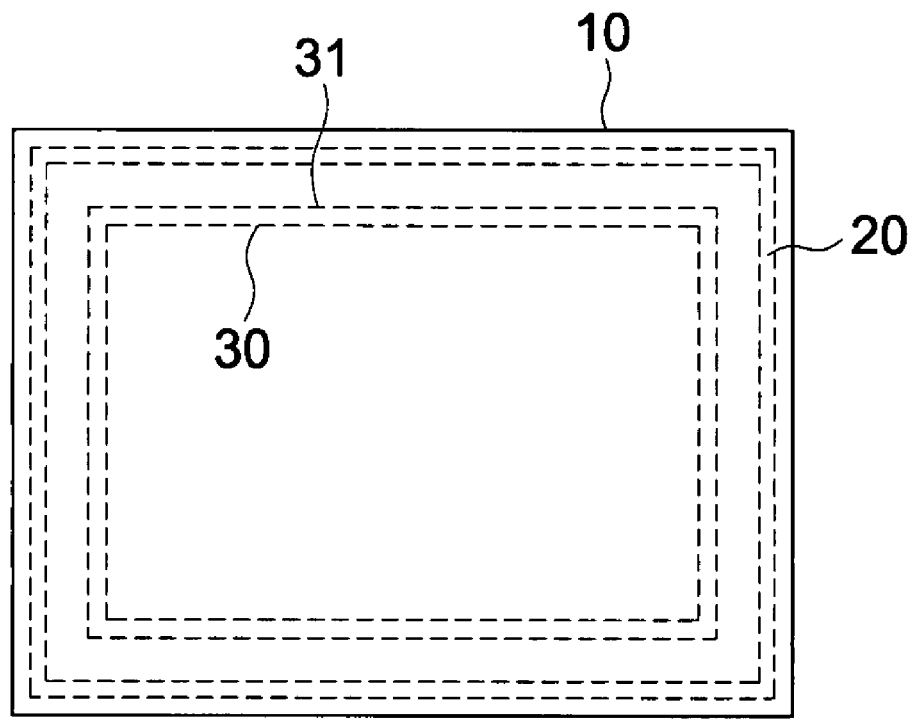
FIGS. 1(a) and 1(b) are cross-sectional view diagrams for explaining the configuration of a general cassette type radiation image detector 1.
Figure 1:
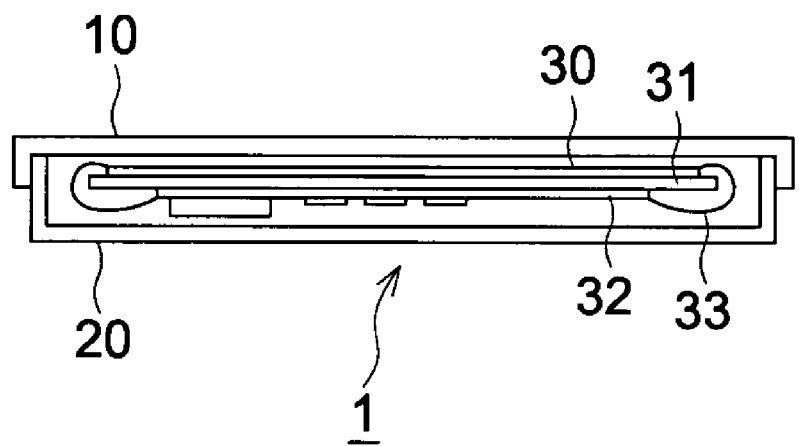

Some preferred embodiments of the present invention are described below referring to the drawings.

FIG. 1 shows the cross-sectional view diagrams for explaining the configuration of a general cassette type radiation image detector 1.

FIG. 1(a) is the plan view diagram, and FIG. 1(b) is the side view diagram.

The cassette type radiation image detector 1 has a radiation detection sensor 30 which is a two-dimensional array type radiation detector sensor, a sensor supporting member 31, and a control board 32, etc., enclosed inside the cassette formed by a front member 10 and a back member 20 engaging with each other.

The radiation detection sensor 30 and the control board 32 are respectively supported by the first surface and the second surface of the sensor supporting member 31. In addition, the radiation detection sensor 30 and the control board 32 are electrically connected to each other via a flexible printed circuit board 33.

The position of the radiation detection sensor 30 along the horizontal direction of the cassette is determined by a supporting member (not shown in the figure) having shock absorbing characteristics that is provided between the sensor supporting member 31 and the back member 20.

Further, the position along the thickness direction of the cassette is determined by the balance between the pressing forces of a first pressing member (not shown in the figure) that is provided on the front member 10 and that pushes the sensor supporting member 31 towards the back member 20, and a second pressing member (not shown in the figure) that is provided on the back member 20 and that pushes the sensor supporting member 31 towards the front member 10.

When a cassette is dropped, and when either the top surface of the front member 10 shown in FIG. 1(b) or the bottom surface of the back member 20 hits against the floor, the shock is dispersed over the wide area of the front member 10 or the back member 20, and as a result, even the shock transmitted to the sensor supporting member 31 is dispersed over its entire surface.

On the other hand, when the side surface of the front member 10 or of the back member 20, or the corner positions hit against the floor, the shock is concentrated in a small area, and in some cases, a part of the front member 10 or of the back member 20 may get deformed.

In this manner, a shock that is concentrated on a part of the cassette is directly transmitted to the radiation detection sensor 30, the sensor supporting member 31, and the control board 32, and in order to avoid these becoming damaged, it is necessary to provide sufficient distance between the inner surface of the back member 20 and the outer periphery of the sensor supporting member, and to provide shock absorbing member that prevents shock between them.

Figure 2:
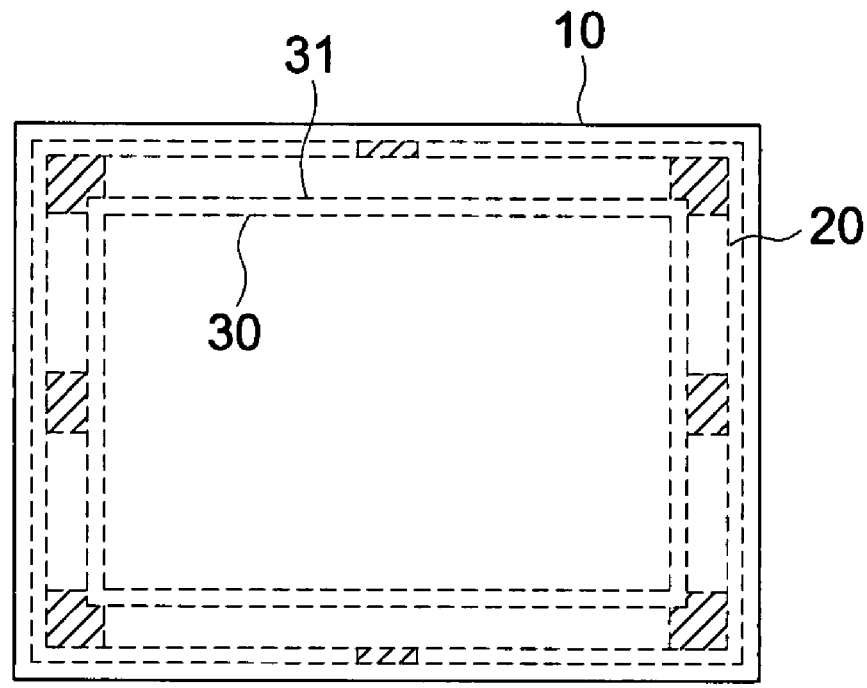
FIGS. 2(a) and 2(b) are figures showing a conventional example 1 of shock prevention.
Figure 2:
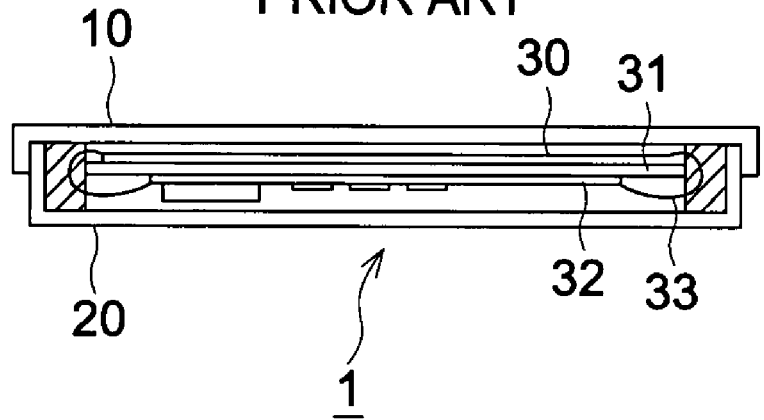

FIGS. 2(a) and 2(b) are figures showing a conventional example 1 of shock prevention.

The parts shown by inclined lines in these figures are the shock absorbing members.

On the outer periphery of the sensor supporting member 31, since a flexible printed circuit board 33 that electrically connects the radiation detection sensor 30 and the control board 32 is present between them, the shock absorbing member is provided at positions avoiding the flexible printed circuit board 33.

As a consequence, it is difficult to provide a shock absorbing material with sufficient size or volume, and as a countermeasure, it will be necessary to provide a distance between the sensor supporting member 31 and the inner surface of the back member 20.

However, since this countermeasure is not a desirable measure as it goes against size reduction of the cassette type radiation detection sensor 1.

Figure 3:
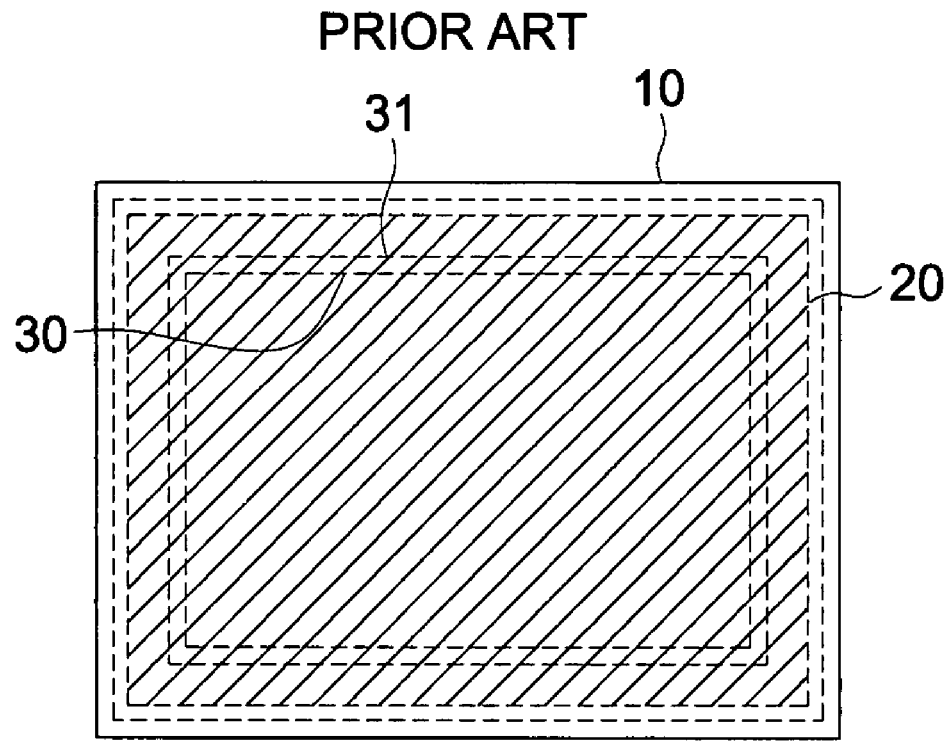
FIGS. 3(a) and 3(b) are figures showing a conventional example 2 of shock prevention.
Figure 3:
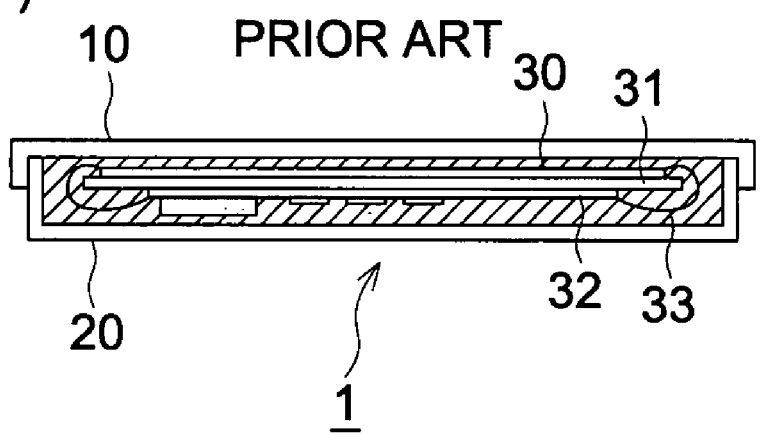

FIGS. 3(a) and 3(b) are figures showing a conventional example 2 of shock prevention. As explained with reference to FIGS. 1(a) and 1(b), the radiation detection sensor 30 and the control board 32 are respectively supported by the first surface and the second surface of the sensor supporting member 31. In addition, the radiation detection sensor 30 and the control board 32 are electrically connected to each other via the flexible printed circuit board 33.

The parts shown by inclined lines in these figures are the shock absorbing members.

As is shown in these figures, shock absorbing material is filled in the space inside the cassette, and the shocks from different directions are absorbed by the filled shock absorbing materials.

However, although effect can be expected from this kind of countermeasure from the point of view of reducing the shock, it is highly likely that it creates new problems in terms of considerations for heat radiation, ease of assembly during the manufacturing process, and ease of maintenance in the market.

FIGS. 4(a), and 4(b) are diagrams for explaining the placements of the first engaging member and the second engaging member which are the features of a cassette type radiation image detector 1 according to the present invention.

FIG. 4(a) is a plan view of the cassette type radiation image detector 1 excepting the front member 10.

The radiation detection sensor 30 is placed in the part shown by the single broken lines on the surface (the first surface) of the sensor supporting member 31. In addition, in the rear surface (the second surface), the first engaging members 311 to 314 are attached along each side.

In this figure, although the description of the flexible printed circuit board 33 that electrically connects the radiation detection sensor 30 and the control board 32 that have been affixed to mutually different surfaces of the sensor supporting member 31 has been omitted, gaps of holes that pass the flexible printed circuit board 33 have been provided in the first engaging members 311 to 314.

FIG. 4(b) is a side cross-sectional view diagram of the cassette type radiation image detector 1.

In this figure, the thickness of the cassette type radiation image detector 1 has been exaggerated for the sake of making the explanations clear.

The position in the direction of the thickness of the cassette (the position in the up-down direction in the figure) of the sensor supporting member 31 is determined by the springs S or members having an appropriate elasticity provided on the front member 10 and on the back member 20. In addition, shocks in the thickness direction are absorbed by these springs S or elastic members. As the elastic members, viscoelastic foam or other plastics may be used.

The second engaging members 211 to 214 are provided on the back member 20 at positions corresponding to the first engaging members 311 to 314.

The shock absorbing members 511 to 514 are placed at the surface at which the first engaging members 311 to 314 and the second engaging members 211 to 214 are opposing each other. In addition, the shock absorbing members 511 to 514 are affixed to either of the surfaces of the first engaging members 311 to 314 or the second engaging members 211 to 214.

Appropriate gaps (for example, 0.1 to 0.5 mm) are provided between the surface of the shock absorbing member 511 to 514 that is opposite to the surface that has been fixed and the surface of the first engaging members 311 to 314 or of the second engaging members 211 to 214.

Because of this gap, the assembling operation of fitting the sensor supporting member 31 to the back member 20 via the first engaging members 311 to 314, the second engaging members 211 to 214, and the shock absorbing members 511 to 514 becomes easy.

In order to make this fitting easy, it is also possible to provide appropriate taper in the direction of fitting on the surfaces of the first engaging members 311 to 314, the second engaging members 211 to 214, and the shock absorbing members 511 to 514.

Further, the numbers, positions, sizes, and shapes of the first engaging members 311 to 314 and the second engaging members 211 to 214, and sizes, shapes, and materials of the shock absorbing members 511 to 514 corresponding to the first engaging members and the second engaging members are determined at the time of designing based on the limiting conditions unique to the product.

In the case of the present preferred embodiment, the absorption of shock when dropped in the up-down direction in FIG. 4(a) becomes possible due to the opposing first engaging member 314, second engaging member 214, shock absorbing member 514 and the first engaging member 312, second engaging member 212, shock absorbing member 512.

Further, in a similar manner, the absorption of shock when dropped in the left-right direction in FIG. 4(a) becomes possible due to the opposing first engaging member 311, second engaging member 211, shock absorbing member 511 and the first engaging member 313, second engaging member 213, shock absorbing member 513.

Figure 5:
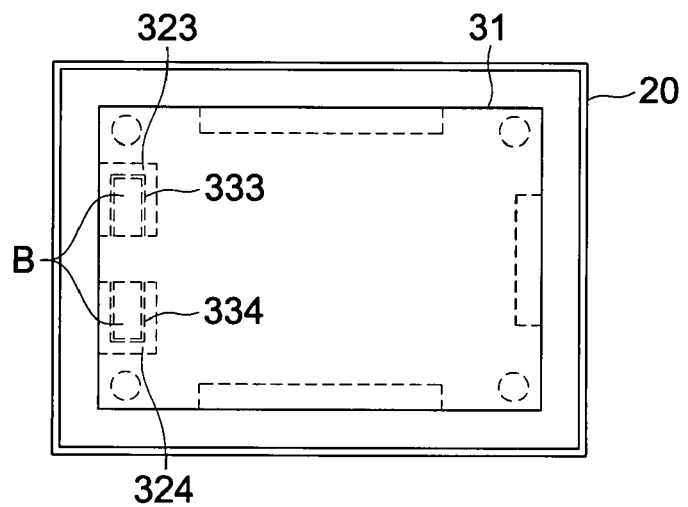
FIG. 5 is a diagram showing an example of a battery supporting member being also a engaging member.

FIG. 5 is a diagram showing an example of a battery supporting member being also a engaging member.

This figure is a plan view diagram corresponding to FIG. 4(a).

Figure 4:
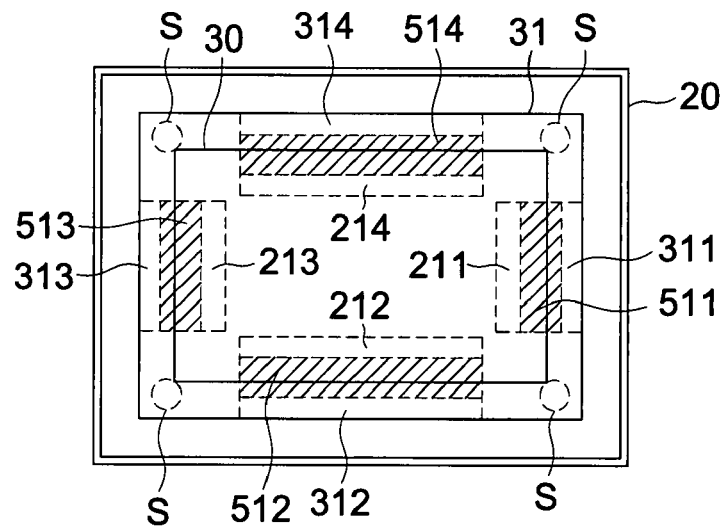
FIGS. 4(a) and 4(b) are diagrams for explaining the preferred embodiments of the present invention.
Figure 4:
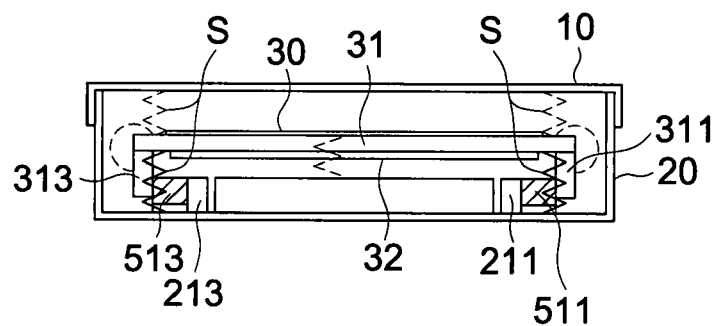

The battery supporting members 323 and 324 not only support the battery B, but their side surfaces 333 and 334 have the same function as the surface at which the first engaging member 313 in FIG. 4 is opposite to the shock absorbing member 513.

The supporting members that support a part having a large volume and mass among the control parts, naturally become large and will have to have strength. In the present invention, the cassette is aimed to be made compact by making the engaging members have the functions of such supporting members.

Further, the battery supporting members 323 and 324 may be provided in the sensor supporting member, or in some cases, may be provided in the control board 32, or the back member 20.

As has been explained above, since the cassette type radiation image detector 1 assembled by fitting the sensor supporting member 31 having the first engaging members 311 to 314 with the back member 20 having the second engaging members 211 to 214 via the shock absorbing members 511 to 514 has shock absorbing materials of sufficient sizes, shocks applied to the sides or to the corners of the cassette are absorbed, and as a result, the shock transmitted to the sensor supporting member 31 and the flexible printed circuit board 33 becomes small, and the radiation detection sensor 30 and the control board 32 supported by the sensor supporting member 31 are protected.

Further, since the front member 10 and the back member 20 are easily separated and closed, the assembly during the manufacturing process and the maintenance operations in the market become easy.

In addition, very often the front member is formed integrally from a carbon plastic having light-shielding characteristics and radiation-transmissive characteristics, and the back member 20 is formed integrally from a polycarbonate plastic, or an ABS plastic, or aluminum having light-shielding characteristics.

Therefore, the second engaging members 211 to 214 described above can also be formed along with the back member 20.

According to the present preferred embodiment, a cassette type radiation image detector is provided that has a shock resistance that can protect the radiation image detection sensor sufficiently when the cassette is dropped, while at the same time not losing its small size and light weight.

What is claimed is:

1. A cassette type radiation image detector comprising a boxshaped cassette housing configured by engaging a front member that is light-shielding and radiation-transmissive, with a light-shielding back member, and a two-dimensional array type radiation detection sensor for detecting radiation images that is provided in the housing, the radiation image detector comprising:

a sensor supporting member that supports the radiation detection sensor;

a first engaging member provided at the sensor supporting member on a side of the sensor supporting member that is opposite to a side of the sensor supporting member where the sensor supporting member supports the radiation detection sensor;

a second engaging member provided at the back member; and a shock absorbing member positioned between the first engaging member and the second engaging member, wherein the first engaging member, the shock absorbing member, and the second engaging member are provided in a plane parallel to a radiation detection surface of the radiation detection sensor, and wherein the boxshaped cassette housing is formed by engaging the first engaging member with the second engaging member via the shock absorbing member.

2. The cassette type radiation image detector of claim 1, wherein the radiation detection sensor is provided at a first surface of the sensor supporting member, and the first engaging member is provided at a second surface of the sensor supporting member, and wherein the cassette type radiation image detector further comprises a control circuit to control the radiation detector sensor, and the control circuit is provided at the second surface of the sensor supporting member.

3. The cassette type radiation image detector of claim 1, wherein the first engaging member is a member for supporting a battery.

4. The cassette type radiation image detector of claim 1, wherein the sensor supporting member has a rectangular shape, and a plurality of the first engaging members are attached along the sides of the sensor supporting member, respectively.

5. The cassette type radiation image detector of claim 4, wherein all of the first engaging members are provided on the side of the sensor supporting member that is opposite to the side of the sensor supporting member where the sensor supporting member supports the radiation detection sensor.

* * * * *